US011025425B2

(12) United States Patent
Modi

(10) Patent No.: US 11,025,425 B2
(45) Date of Patent: Jun. 1, 2021

(54) USER SECURITY TOKEN INVALIDATION

(71) Applicant: Elasticsearch B.V., Mountain View, CA (US)

(72) Inventor: Jayesh Modi, Lafayette, CO (US)

(73) Assignee: Elasticsearch B.V., Amsterdam (NL)

( * ) Notice: Subject to any disclaimer, the term of this patent is extended or adjusted under 35 U.S.C. 154(b) by 117 days.

(21) Appl. No.: 16/017,797

(22) Filed: Jun. 25, 2018

(65) Prior Publication Data
US 2019/0394040 A1    Dec. 26, 2019

(51) Int. Cl.
| *H04L 9/06* | (2006.01) |
| *H04L 9/08* | (2006.01) |
| *H04L 9/14* | (2006.01) |
| *H04L 29/06* | (2006.01) |
| *H04L 9/00* | (2006.01) |
| *H04L 9/32* | (2006.01) |

(52) U.S. Cl.
CPC ............ *H04L 9/3213* (2013.01); *H04L 9/001* (2013.01); *H04L 9/0861* (2013.01); *H04L 9/0894* (2013.01); *H04L 9/14* (2013.01); *H04L 63/0853* (2013.01)

(58) Field of Classification Search
CPC ... H04L 9/0891; H04L 9/3213; H04L 9/0861; H04L 9/65; H04L 9/14; H04L 9/001; H04L 9/0894; H04L 63/0457
See application file for complete search history.

(56) References Cited

U.S. PATENT DOCUMENTS

| 7,130,839 | B2 | 10/2006 | Boreham et al. |
| 7,644,432 | B2 | 1/2010 | Patrick et al. |
| 7,801,967 | B1 | 9/2010 | Bedell et al. |
| 7,970,791 | B2 | 6/2011 | Liao et al. |
| 7,975,292 | B2 | 7/2011 | Corella |
| 7,996,392 | B2 | 8/2011 | Liao et al. |
| 8,005,816 | B2 | 8/2011 | Krishnaprasad et al. |
| 8,027,982 | B2 | 9/2011 | Ture et al. |
| 8,166,310 | B2 | 4/2012 | Harrison et al. |

(Continued)

OTHER PUBLICATIONS

Willnauer, Daniel, "Default Password Removal," U.S. Appl. No. 16/047,959, filed Jul. 27, 2018, Specification, claims, Abstract, and Drawings, 37 pages.

(Continued)

*Primary Examiner* — Alexander Lagor
*Assistant Examiner* — Vu V Tran
(74) *Attorney, Agent, or Firm* — Carr & Ferrell LLP

(57) ABSTRACT

Provided are methods and systems for invalidating user security tokens. An example method may include providing, by one or more nodes in a cluster, a list of revoked security tokens. The method may include receiving, by the one or more nodes, an indication of invalidating a user security token associated with a user device. The indication may include a request from the user to invalidate the user security token. The method may further include, in response to the receiving, adding, by the one or more nodes, the user security token to the list of revoked security tokens. The user security token can be added to the list of revoked security tokens prior to the expiration time of the user security token. The method may further include replicating, by the one or more nodes, the list of revoked security tokens between further nodes of the cluster.

15 Claims, 5 Drawing Sheets

(56) References Cited

U.S. PATENT DOCUMENTS

| | | | |
|---|---|---|---|
| 8,214,394 | B2 | 7/2012 | Krishnaprasad et al. |
| 8,239,414 | B2 | 8/2012 | Liao et al. |
| 8,332,430 | B2 | 12/2012 | Koide et al. |
| 8,352,475 | B2 | 1/2013 | Bhatkar et al. |
| 8,412,717 | B2 | 4/2013 | Liao et al. |
| 8,433,712 | B2 | 4/2013 | Koide et al. |
| 8,595,255 | B2 | 11/2013 | Krishnaprasad et al. |
| 8,601,028 | B2 | 12/2013 | Liao et al. |
| 8,626,794 | B2 | 1/2014 | Liao et al. |
| 8,707,451 | B2 | 4/2014 | Ture et al. |
| 8,725,770 | B2 | 5/2014 | Koide et al. |
| 8,793,489 | B2 | 7/2014 | Polunin et al. |
| 8,838,961 | B2 | 9/2014 | Zarfoss, III et al. |
| 8,875,249 | B2 | 10/2014 | Ture et al. |
| 9,069,979 | B2 | 6/2015 | Srinivasan et al. |
| 9,071,606 | B2 | 6/2015 | Braun et al. |
| 9,081,816 | B2 | 7/2015 | Krishnaprasad et al. |
| 9,081,950 | B2 | 7/2015 | Jain et al. |
| 9,130,920 | B2 | 9/2015 | Pelykh |
| 9,177,124 | B2 | 11/2015 | Krishnaprasad et al. |
| 9,251,364 | B2 | 2/2016 | Ture et al. |
| 9,288,042 | B1 | 3/2016 | Madhukar et al. |
| 9,407,433 | B1 | 8/2016 | Sohi et al. |
| 9,436,968 | B1 | 9/2016 | Kobets et al. |
| 9,467,437 | B2 | 10/2016 | Krishnaprasad et al. |
| 9,479,494 | B2 | 10/2016 | Krishnaprasad et al. |
| 9,594,922 | B1* | 3/2017 | McGuire ............... H04L 9/0891 |
| 9,734,309 | B1 | 8/2017 | Allen |
| 9,742,779 | B2 | 8/2017 | Ngo et al. |
| 9,781,102 | B1 | 10/2017 | Knjazihhin et al. |
| 9,858,195 | B2 | 1/2018 | Bhogal et al. |
| 9,930,033 | B2 | 3/2018 | Chhabra et al. |
| 10,083,247 | B2 | 9/2018 | Brown et al. |
| 10,114,964 | B2 | 10/2018 | Ramesh et al. |
| 10,382,421 | B2 | 8/2019 | Krishnaprasad et al. |
| 10,505,982 | B2 | 12/2019 | Motukuru et al. |
| 10,659,307 | B2 | 5/2020 | Sinn |
| 2003/0037234 | A1* | 2/2003 | Fu ........................ H04L 9/3268 713/158 |
| 2003/0105742 | A1 | 6/2003 | Boreham et al. |
| 2004/0210767 | A1 | 10/2004 | Sinclair et al. |
| 2006/0059359 | A1 | 3/2006 | Reasor et al. |
| 2007/0208714 | A1 | 9/2007 | Ture et al. |
| 2008/0313712 | A1 | 12/2008 | Ellison et al. |
| 2009/0046862 | A1 | 2/2009 | Ito et al. |
| 2009/0106271 | A1 | 4/2009 | Chieu et al. |
| 2009/0204590 | A1 | 8/2009 | Yaskin et al. |
| 2009/0254642 | A1 | 10/2009 | Geist |
| 2009/0271624 | A1 | 10/2009 | Cao et al. |
| 2010/0022306 | A1 | 1/2010 | Campion |
| 2010/0146611 | A1 | 6/2010 | Kuzin et al. |
| 2010/0198804 | A1 | 8/2010 | Yaskin et al. |
| 2011/0265160 | A1 | 10/2011 | Nettleton |
| 2012/0090037 | A1 | 4/2012 | Levit |
| 2012/0151563 | A1 | 6/2012 | Bolik et al. |
| 2013/0080520 | A1 | 3/2013 | Kiukkonen et al. |
| 2013/0152191 | A1 | 6/2013 | Bright et al. |
| 2013/0212703 | A1 | 8/2013 | Ramesh et al. |
| 2013/0232539 | A1 | 9/2013 | Polunin et al. |
| 2013/0326588 | A1 | 12/2013 | Jain et al. |
| 2014/0075501 | A1 | 3/2014 | Srinivasan et al. |
| 2014/0196115 | A1 | 7/2014 | Pelykh |
| 2014/0208100 | A1 | 7/2014 | Kendall |
| 2014/0337941 | A1 | 11/2014 | Kominar et al. |
| 2015/0012919 | A1 | 1/2015 | Moss et al. |
| 2015/0112870 | A1* | 4/2015 | Nagasundaram .... G06Q 20/401 705/67 |
| 2015/0169875 | A1* | 6/2015 | Ide ........................... G06F 8/63 713/2 |
| 2015/0363607 | A1 | 12/2015 | Yang et al. |
| 2016/0173475 | A1 | 6/2016 | Srinivasan et al. |
| 2017/0083698 | A1 | 3/2017 | Scott et al. |
| 2017/0103470 | A1 | 4/2017 | Raju |
| 2017/0134434 | A1 | 5/2017 | Allen |
| 2017/0353444 | A1* | 12/2017 | Karangutkar ....... H04L 63/0815 |
| 2018/0210901 | A1 | 7/2018 | DePaoli et al. |
| 2018/0300117 | A1 | 10/2018 | Ackerman |
| 2018/0367528 | A1 | 12/2018 | Schwarz et al. |
| 2019/0018869 | A1 | 1/2019 | Bhagwat et al. |
| 2019/0018870 | A1 | 1/2019 | Bhagwat et al. |
| 2019/0052537 | A1 | 2/2019 | Sinn |
| 2020/0007549 | A1 | 1/2020 | Gormley |
| 2020/0036522 | A1 | 1/2020 | Willnauer |
| 2020/0036527 | A1 | 1/2020 | Girdhar et al. |
| 2020/0184090 | A1 | 6/2020 | Grand |

OTHER PUBLICATIONS

Willnauer, Daniel., "Shard Splitting," U.S. Appl. No. 16/176,956, dated Oct. 31, 2018, Specification, Claims, Abstract, and Drawings, 47 pages.

"Search Query Report", IP.com, performed Dec. 18, 2020, 4 pages.

* cited by examiner

USER SECURITY TOKEN INVALIDATION

TECHNICAL FIELD

This disclosure relates to computer security. More specifically, this disclosure relates to systems and methods for invalidating user security tokens.

BACKGROUND

Security of network communication between user devices and remote computing resources, such as servers and computing clouds, has been a major issue. The remote computing resources can be vulnerable to unauthorized access by malicious users. Malicious users can submit intercepted passwords to the remote computing resources in an attempt to receive unauthorized access to the data. Verifiable authentication tokens can be used to prevent such unauthorized access. The tokens can be generated by the remote computing resources and distributed to the user devices. The tokens can be leased to user devices for a period during which the user devices can use the tokens to access services of the remote computing resources. The tokens can be stored as browser cookies or in key stores. However, the tokens themselves can be subject to interception by the malicious users and malicious software and can be used for unauthorized access to data and services of the remote computing resources. Therefore, there is a need for improvement of security by using the verifiable authentication tokens.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to a technology for managing user security tokens in clusters comprising a plurality of computing nodes. Some embodiments of the present disclosure may facilitate preventing security tokens from unauthorized access by third parties.

According to one example embodiment of the present disclosure, a method for invalidating user security tokens is provided. The method may include providing, by one or more nodes in a cluster, a list of revoked security tokens. The method may further include receiving, by the one or more nodes, an indication of invalidating a user security token associated with a user. In response to the receiving the indication, the method may allow adding, by the one or more nodes, the user security token to the list of revoked security tokens. The method may further include replicating, by the one or more nodes, the list of revoked security tokens between further nodes of the cluster.

The indication of invalidating the user security token may include a request from the user to invalidate the user security token. The user security token may include information regarding the user device, an issue time of the user security token, and expiration time of the user security token. The user security token can be generated based on a request from the user. The user security token can be added to the list of revoked security tokens prior to the expiration time of the user security token.

The method may further include determining, by the one or more nodes, that the issue time precedes a predetermined time. In response to the determination, the method may include adding, by the one or more nodes, the user security token to the list of revoked security tokens.

The user security token can be encrypted using an authenticated encryption and a symmetric key. The symmetric key can be a pre-shared key or a key generated at runtime based on a shared secret between the nodes of the cluster. The method may include, upon restarting the cluster, generating, by the one or more nodes, a key to be used for the authenticated encryption. The method may also include, upon restarting the cluster, invalidating, by the one or more nodes, previously issued user security tokens.

A system for invalidating user security tokens is provided. The system can comprise a cluster including one or more nodes. The nodes can be configured to implement operations of the above-mentioned method for invalidating user security tokens.

According to yet another example embodiment of the present disclosure, the operations of the above-mentioned method for invalidating user security tokens are stored on a machine-readable medium comprising instructions, which when implemented by one or more processors, perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

Figure 1:
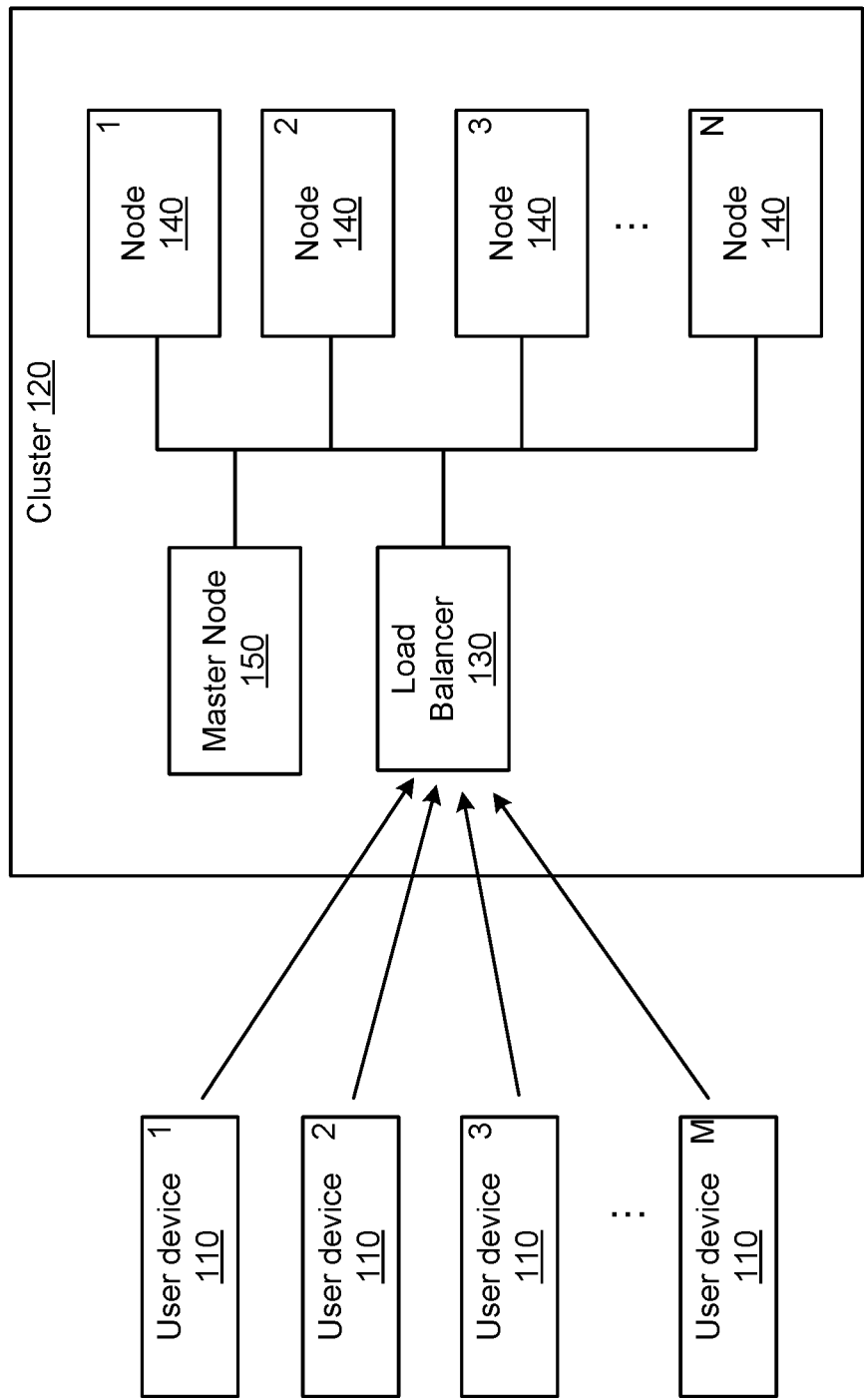
FIG. 1 is a block diagram of an example environment suitable for practicing methods for invalidating user security tokens as described herein.

The technology disclosed herein is concerned with methods and systems for invalidating user security tokens in clusters comprising computing nodes. Embodiments of the present disclosure may facilitate preventing the security tokens from unauthorized use by third parties.

The security tokens can be used in network communication between user devices and clusters including one or more (computing) nodes using stateful or stateless communication protocols. The stateful communication protocols may include a transmission control protocol (TCP), a file transfer protocol (FTP), and others. The stateless communication protocols may include a User Datagram Protocol (UDP), Hypertext Transfer Protocol (HTTP), and others. Stateless communication protocols may not require generating and storing a session state for keeping information regarding a service session between a user device and the clusters.

According to some embodiments of the present disclosure, when a user device sends session requests to the cluster, the two different requests from the same session can be processed by two different nodes of the cluster. Therefore, if a session state is used to store the information concerning the session, the session state should be accessible by all nodes in the cluster or replicated between all nodes of the cluster. This may cause unwanted use of computational resources (processing time of nodes and communication time between the nodes) and delays in generating responses to the session requests. Therefore, using stateless communication protocols can be preferable when the session requests are processed by several nodes in the cluster.

In some embodiments of the present disclosure, upon receiving a new session request from a user device, the cluster can generate a user security token to be used with all further requests associated with the new session. The user security token can include an identifier and information regarding the user device and/or a user of the user device. The user security token may have an expiration time, so it can be used by the user device only within a predetermined period of time. Upon receiving a user security token from the user device, the user security token can be validated or invalidated by any of the nodes of the cluster.

One of the shortcomings of the user security tokens is that there may be a lag between the time the user device stops using the user security token and the time the user security token becomes invalid due to the expiration time. During this lag, the user security token can be used by malicious users and malicious software to gain unauthorized access to the cluster. To prevent an unauthorized use of the security token, the user security token can be invalidated by the cluster immediately after the user device indicates that the user security token is no longer in use.

According to one example embodiment of the present disclosure, a method for invalidating user security tokens may include providing, by one or more nodes in a cluster, a list of revoked security tokens. The method may further include receiving, by the one or more nodes, an indication of invalidating a user security token associated with a user. In response to the receiving of the indication, the method may further allow adding, by the one or more nodes, the user security token to the list of revoked security tokens. The method may further include replicating, by the one or more nodes, the list of revoked security tokens between further nodes of the cluster.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example environment 100 suitable for practicing methods described herein. It should be noted, however, that the environment 100 is just one example and is a simplified embodiment provided for illustrative purposes, and reasonable deviations of this embodiment are possible as will be evident to those skilled in the art.

As shown in FIG. 1, the environment 100 may include one or more user device(s) 110 and at least one cluster 120. In various embodiments, the user device(s) 110 may include, but are not limited to, a laptop computer, a tablet computer, a desktop computer, and so forth. The user device(s) 110 can include any appropriate device having network functionalities allowing the user device(s) 110 to communicate to the cluster 120. In some embodiments, the user device(s) 110 can be connected to the cluster 120 via one or more wired or wireless communications networks.

In some embodiments, the cluster 120 may include a load balancer 130 and one or more computing node(s) 140. The cluster 120 may also include a master node 150. The cluster 120 may further include network switches and/or routers for connecting the load balancer 130, the one or more node(s) 140, and the master node 150.

In some embodiments, the one or more node(s) 140 may be configured to run one or more applications that can be available to the user device(s) 110. Users of the user device(s) 110 can access the applications on the cluster 120 using an Internet browser, a terminal application, a FTP client, and other applications configured to run on the user device(s) 110.

Generally, the user device(s) 110 may send request(s) to the cluster 120. The request(s) can be associated with an application configured to run on the computing node(s) 140. The user requests can be formatted per one or more communication protocols. The communication protocols may include a stateless protocol (for example, UDP, HTTP, and the like) or a stateful protocol (e.g., TCP, FTP, and the like).

When the cluster 120 receives a request from the one or more user device(s) 110, the load balancer 130 may select a node from the one or more computing node(s) 140 to process the request. When selecting the node 140, the load balancer 130 may be configured to distribute the user devices 110's request(s) to the computing nodes 140 based on a load balancing algorithm. The request can be further transferred to the selected node. The selected node can process the request and send a response to the user device 110 from which the request was originated.

Figure 2:
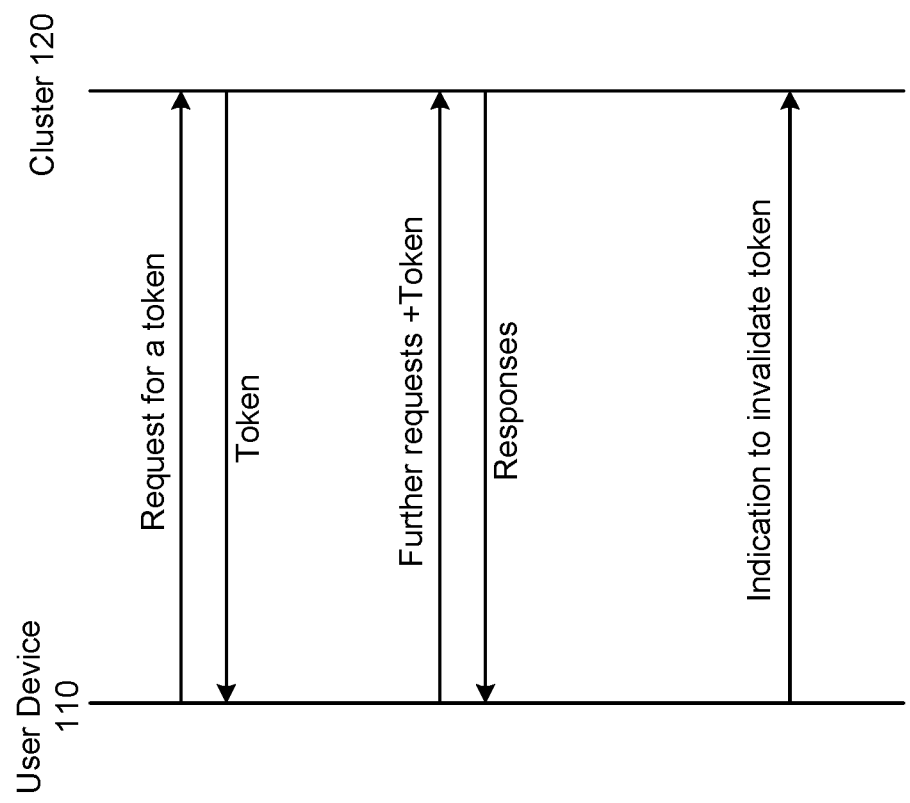
FIG. 2 is a schematic showing interaction of a user device and a cluster, according to some example embodiments.

FIG. 2 is a schematic 200 showing interaction of a user device 110 and the cluster 120, according to some example embodiments of the present disclosure. The user device 110 may send a request for a token to the cluster 120. The request for a token may include a user login and a user password of a user of the user device 110. The cluster 120 can be configured to generate a user security token and send the user security token to the user device 110. The request for the token can be forwarded to one of the computing nodes 140. The computing node 140 handling the request for the token may be configured to generate the user security token for the user device 110.

The user device 110 may send the user security token with a further request to the cluster 120. The further request can be forwarded to one of the computing nodes 140, which can be a different node than the computing node that generated the user security token. The computing node 140 may be configured to verify the user security token. If the user security token is valid, the computing node 140 may further process the further request to generate a response and send the response to the user device 110. The user security token can be used until it is invalidated. The user device 140 may be configured to send an indication to invalidate the user security token. The user security token can be also assigned an expiration time after which the user security token becomes invalid.

Figure 3:
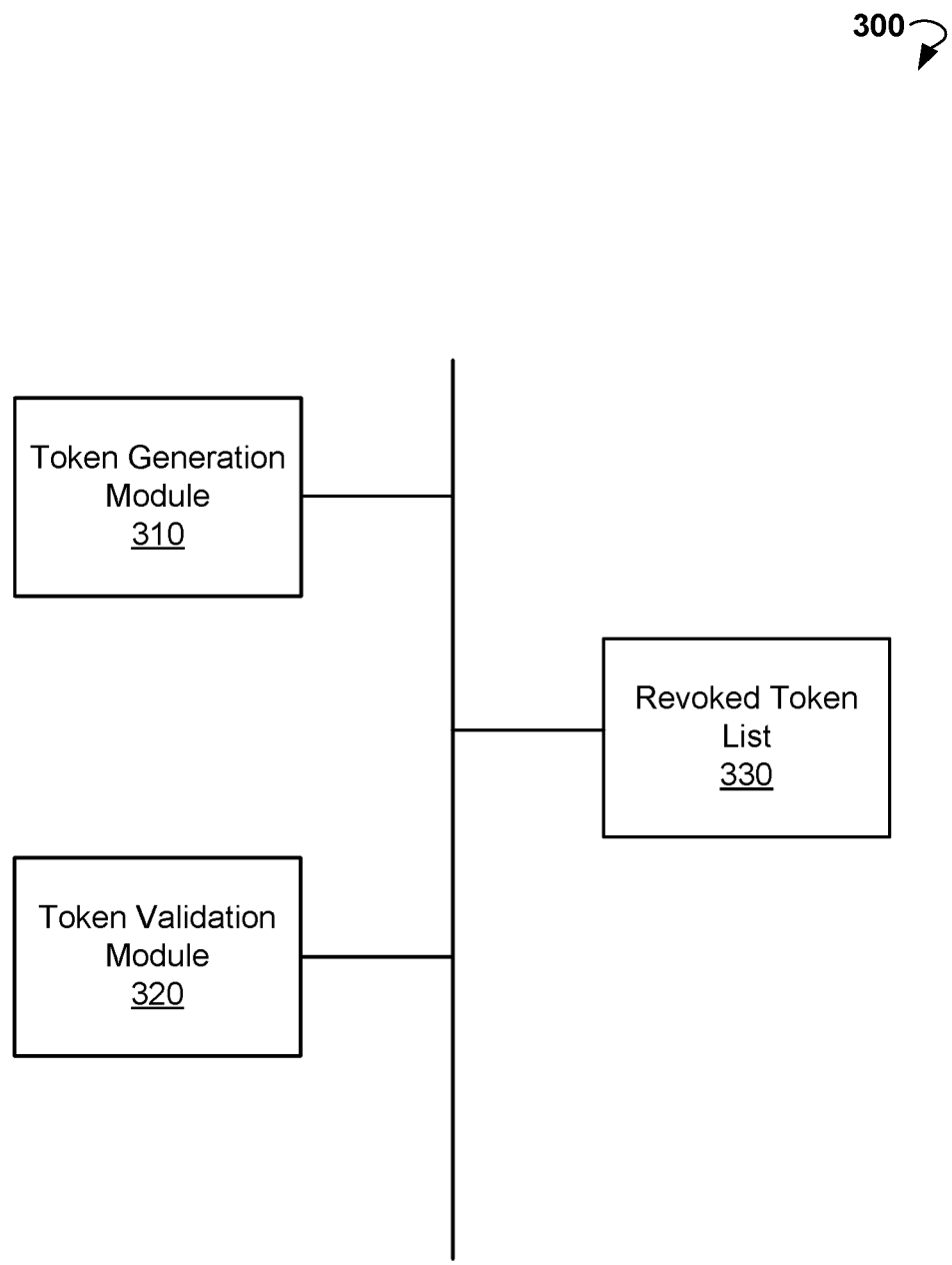
FIG. 3 is a block diagram showing an example system for managing user security tokens, according to an example embodiment.

FIG. 3 is a block diagram showing modules of the system 300 for managing user security tokens, according to some example embodiments. The system 300 may include a token generation module 310, a token validation module 320, and a revoked token list 320. The modules of the system 300 can be implemented as instructions in memory of computing nodes 140 to be execute by the processors of the computing nodes 140.

The token generation module 310 may receive a request for a token from the user device(s) 110 and generate the user security token. The user security token may include an identifier, an information regarding the user device(s) 110 and/or a user of the user device 110, time of issue of the user security token, and an expiration time of the user security token. The length of the user security token may be selected to be as minimum as possible but still allow the computing node(s) 140 of the cluster 120 to retrieve information regarding the user device 110 from the user security token.

The user security token can be encrypted with authenticated encryption and formatted into an opaque string, which may include a ciphertext and a message authentication code (MAC). A system key or a generated key can be used in authenticated encryption. The key can be generated on the master node 150. The generated key can be further retrieved by the computing node(s) 140 for generating user security tokens. The key can be generated based on a shared secret between the nodes of the cluster 120. A new key can be generated immediately after each full restart of the cluster 120. As result, all user security tokens issued before the full restart become invalid. The new key may not be required to be generated during a rolling restart of applications on the computing nodes 140.

The token validation module 320 can be configured to receive the user security tokens from the user device(s) 110 and determine whether the user security tokens are valid or invalid. The user security token can be decrypted using a system key or a key generated at last restart of the cluster 120. The user security token can be valid if the expiration time of the user security token is not expired, the user security token is not found in the revoked token list 330, and the issue time of the user security token is not earlier than a predetermined time.

The token validation module 320 can be further configured to receive an indication to invalidate a user security token. Upon receiving the indication, the user security token can be added to the revoked token list 330. The user security token can be added to the revoked token list 330 even if the expiration time of the user security token is not expired. The revoked token list 330 can be further immediately replicated between the all the computing nodes 140 of the cluster 120. This may allow preventing reuse of a user security token by all nodes in cluster 120 after invalidating the use security token by one of the nodes. The revoked token list 330 can be also stored in a cluster state (for example, on the master node 150).

The indication to invalidate a security token may include a request from a user device(s) 110 to invalidate the user security token. The indication to invalidate the token may also include a request from an administrator of the cluster 120 to invalidate one or more of the user security tokens. The indication to invalidate one or more user security tokens can be also issued by one or more applications running on the cluster 120.

Figure 4:
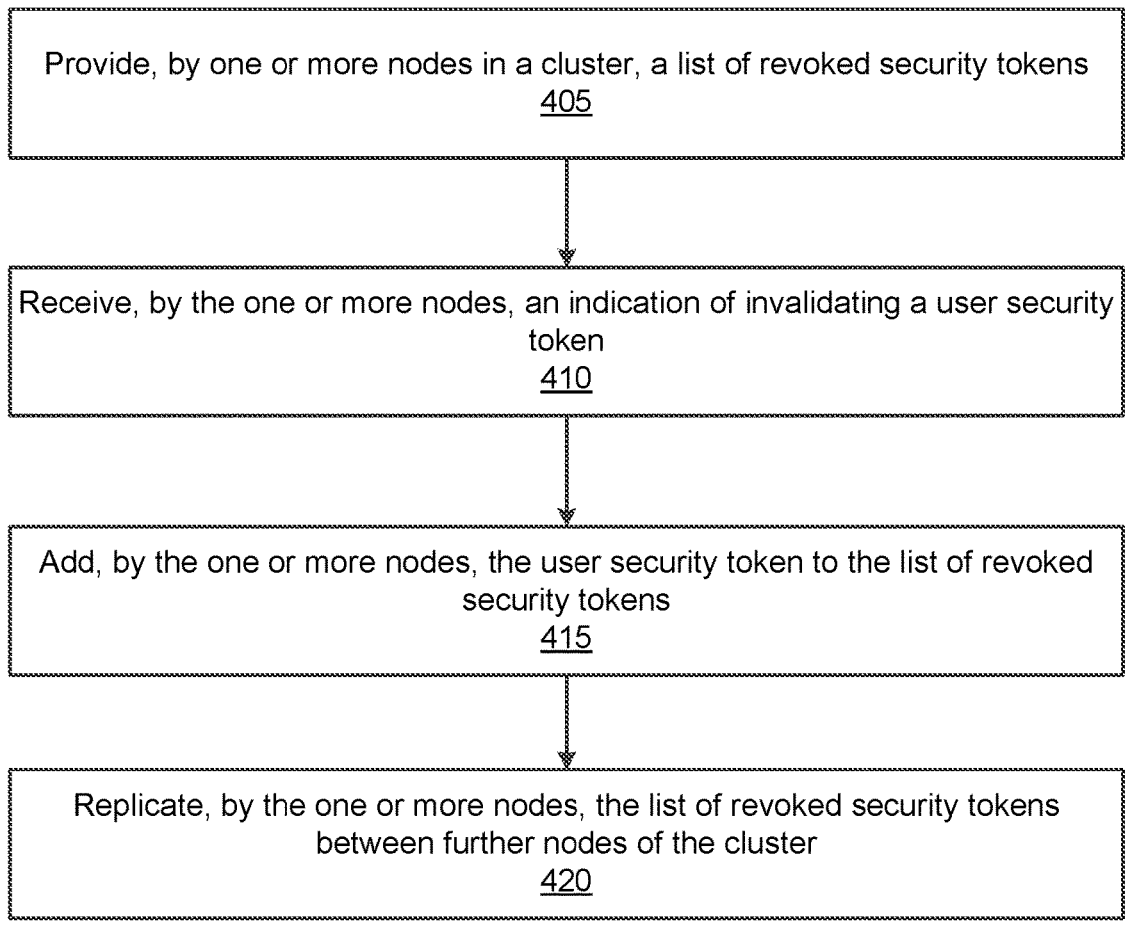
FIG. 4 is a flow chart of an example method for invalidating user security tokens, according to some example embodiments.

FIG. 4 is a flow chart of an example method 400 for invalidating security tokens, according to some example embodiments. The method 400 may be performed within environment 100 illustrated in FIG. 1. Notably, the steps recited below may be implemented in an order different than described and shown in the FIG. 4. Moreover, the method 400 may have additional steps not shown herein, but which can be evident to those skilled in the art from the present disclosure.

In block 405, the method 400 may commence with providing, by one or more nodes in a cluster, a list of revoked security tokens.

In block 410, the method 400 may proceed with receiving, by the one or more nodes, an indication of invalidating a user security token associated with a user. The indication may include a request from a user to invalidate the user security token or a request from an administrator of the cluster 120 to invalidate the security token. The request for invalidating the user security can be also generated by one or more applications running on nodes of the cluster.

In block 415, the method 400 may proceed with adding, by the one or more nodes, the user security token to the list of revoked security tokens. The user security token can be added to the list of revoked security tokens before an expiration time of the user security token.

In block 420, the method 400 may proceed with replicating, by the one or more nodes, the list of revoked security tokens between further nodes of the cluster.

Figure 5:
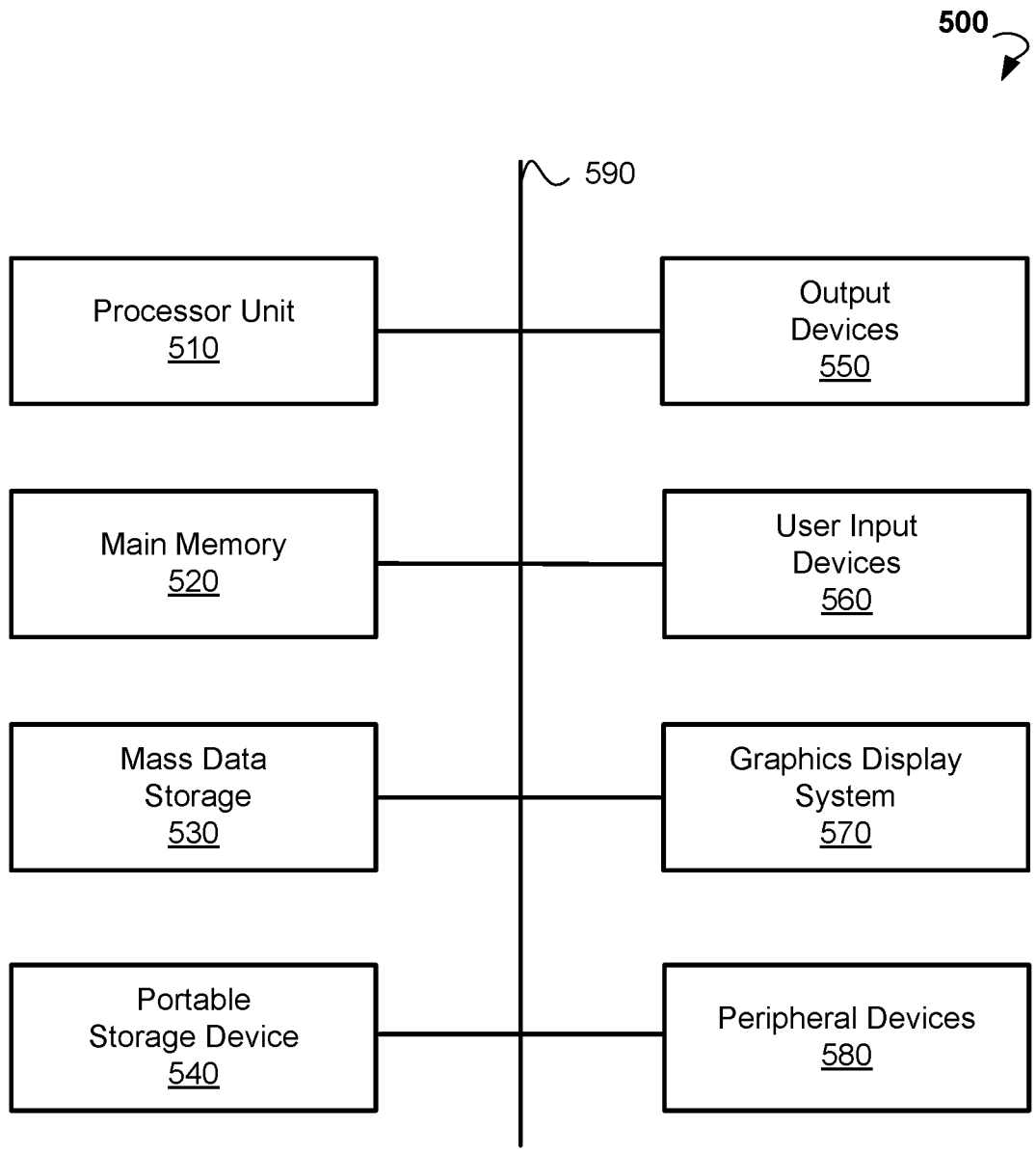
FIG. 5 is an example computer system that can be used to implement some embodiments of the present disclosure.

FIG. 5 illustrates an exemplary computer system 500 that may be used to implement some embodiments of the present disclosure. The computer system 500 of FIG. 5 may be implemented in the contexts of the likes of the user device(s) 110 and the load balancer 130, one or more computing node(s) 140, and a master node 150. The computer system 500 of FIG. 5 includes one or more processor units 510 and main memory 520. Main memory 520 stores, in part, instructions and data for execution by processor units 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones; an alphanumeric keypad, such as a keyboard, for inputting alphanumeric and other information; or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 can include a liquid crystal display (LCD) or other suitable display device. Graphics display system 570 is configurable to receive textual and graphical information and process the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for invalidating user security tokens, the method comprising:
storing, by one or more nodes in a cluster, a list of revoked security tokens;
receiving, by the one or more nodes, an indication of invalidating a user security token associated with a user device, wherein:
the user security token is generated by the one or more nodes in the cluster in response to starting a session between the user device and the cluster, the session including requests from the user device to the one or more nodes in the cluster, the user security token being used by the one or more nodes to verify the requests; and
the indication is sent by the user device immediately after the user device stops using the user security token at end of the session;
in response to the receiving, adding, by the one or more nodes, the user security token to the list of revoked security tokens, the user security token being encrypted using an authenticated encryption; and
upon a restart of the cluster, generating, by the one or more nodes, a key to be used for the authenticated encryption, the key being generated based on a shared secret between the one or more nodes of the cluster.

2. The method of claim 1, further comprising replicating, by the one or more nodes, the list of revoked security tokens between further nodes of the cluster.

3. The method of claim 1, wherein the indication of invalidating of the user security token includes a request from the user device to invalidate the user security token.

4. The method of claim 1, wherein the user security token includes information regarding the user device, an issue time of the user security token, and an expiration time of the user security token.

5. The method of claim 4, wherein the user security token is added to the list of revoked security tokens prior to the expiration time of the user security token.

6. The method of claim 4, further comprising:
determining, by the one or more nodes, that the issue time precedes a predetermined time; and
in response to the determination, adding, by the one or more nodes, the user security token to the list of revoked security tokens.

7. The method of claim 1, further comprising upon the restart of the cluster, invalidating, by the one or more nodes, previously issued user security tokens.

8. A system for invalidating user security tokens, the system comprising a cluster including one or more nodes comprising a processor and a memory being configured to store programmable instructions, wherein upon executing by the processor the programmable instructions, the one or more nodes are configured to:
store a list of revoked security tokens;
receive an indication of invalidating a user security token associated with a user device, wherein:
the user security token is generated by the one or more nodes in the cluster in response to starting a session between the user device and the cluster, the session including requests from the user device to the one or more nodes in the cluster, the user security token being used by the one or more nodes to verify the requests; and
the indication is sent by the user device immediately after the user device stops using the user security token at end of the session;
in response to the receiving the indication, add, by the one or more nodes, the user security token to the list of revoked security tokens, the user security token being encrypted using an authenticated encryption; and
upon a restart of the cluster, generate, by the one or more nodes, a key to be used for the authenticated encryption, the key being generated based on a shared secret between the one or more nodes of the cluster.

9. The system of claim 8, wherein the one or more nodes are further configured to replicate the list of revoked security tokens between further nodes of the cluster.

10. The system of claim 8, wherein the indication of invalidating a user security token includes a request from the user device to invalidate the user security token.

11. The system of claim 8, wherein the user security token includes information regarding the user device, an issue time of the user security token, and expiration time of the user security token.

12. The system of claim 11, wherein the user security token is added to the list of revoked security tokens prior to the expiration time of the user security token.

13. The system of claim 11, wherein the one or more nodes is further configured to:
   determine that the issue time of the user security token precedes a predetermined time; and
   in response to the determination, add the user security token to the list of revoked security tokens.

14. The system of claim 8, wherein, upon the restart of the cluster, the one or more nodes are further configured to invalidate previously issued security tokens.

15. A non-transitory computer-readable storage medium having embodied thereon instructions, which when executed by at least one processor, perform steps of a method, the method comprising:
   storing, by one or more nodes in a cluster, a list of revoked security tokens;
   receiving, by the one or more nodes, an indication of invalidating a user security token associated with a user device, wherein:
   the user security token is generated by the one or more nodes in the cluster in response to starting a session between the user device and the cluster, the session including requests from the user device to the one or more nodes in the cluster, the user security token being used by the one or more nodes to verify the requests; and
   the indication is sent by the user device immediately after the user device stops using the user security token at end of the session;
   in response to the receiving the indication, adding, by the one or more nodes, the user security token to the list of revoked security tokens, the user security token being encrypted using an authenticated encryption; and
   upon a restart of the cluster, generating, by the one or more nodes, a key to be used for the authenticated encryption, the key being generated based on a shared secret between the one or more nodes of the cluster.

\* \* \* \* \*